(12) United States Patent
Zaghloul et al.

(10) Patent No.: US 7,013,137 B2
(45) Date of Patent: Mar. 14, 2006

(54) SMALLER APERTURE ANTENNA FOR MULTIPLE SPOT BEAM SATELLITES

(75) Inventors: Amir I. Zaghloul, Bethesda, MD (US); Ozlem Killic, Gaithersburg, MD (US); Albert E. Williams, Bethesda, MD (US)

(73) Assignee: Comsat Corporation, Clarksburg, MD (US)

( * ) Notice: Subject to any disclaimer, the term of this patent is extended or adjusted under 35 U.S.C. 154(b) by 468 days.

(21) Appl. No.: 09/904,624

(22) Filed: Jul. 16, 2001

(65) Prior Publication Data

US 2002/0039883 A1  Apr. 4, 2002

Related U.S. Application Data

(60) Provisional application No. 60/218,214, filed on Jul. 14, 2000.

(51) Int. Cl.
*H04Q 7/20* (2006.01)

(52) U.S. Cl. ............... 455/429; 455/12.1; 455/428; 455/427; 455/430; 370/316; 370/323; 342/352; 342/354

(58) Field of Classification Search ............... 455/427, 455/428, 429, 430, 12.1; 370/316–326; 342/352, 342/354, 357.1, 368; 343/824, 853; 244/158 R, 244/FOR. 104

See application file for complete search history.

(56) References Cited

U.S. PATENT DOCUMENTS

| | | | | |
|---|---|---|---|---|
| 5,594,460 A | * | 1/1997 | Eguchi | 343/765 |
| 5,758,260 A | * | 5/1998 | Wiedeman | 455/12.1 |
| 5,936,588 A | * | 8/1999 | Rao et al. | 343/754 |
| 6,101,385 A | * | 8/2000 | Monte et al. | 455/427 |
| 6,377,558 B1 | * | 4/2002 | Dent | 370/321 |
| 6,434,384 B1 | * | 8/2002 | Norin et al. | 455/429 |

* cited by examiner

*Primary Examiner*—Stephen M. D'Agosta
(74) *Attorney, Agent, or Firm*—Sughrue Mion, PLLC

(57) ABSTRACT

This disclosure describes a method to generate large numbers of spot beams for multiple-beam satellite systems using smaller apertures. This is done by dividing the basic spot beam that has 3 to 4 dB of gain drop within the beam into a number of smaller 1-dB sub-beams. This has the effect of reducing the required peak gain for the antenna by 2–3 dB, thus reducing its size by as much as 50%. The frequency band allocated to the basic beam will be divided among the sub-beams. However, the frequency re-use among the basic beams can be maintained. Frequency allocations have to be coordinated among all beams. This concept is especially applicable to phased arrays using digital beam formers. The DBF complexity is a function of the number of array elements, and is less dependent on the number of beams. Reducing the array size, and consequently reducing the number of elements helps in reducing the complexity, power and mass of the DBF.

6 Claims, 5 Drawing Sheets

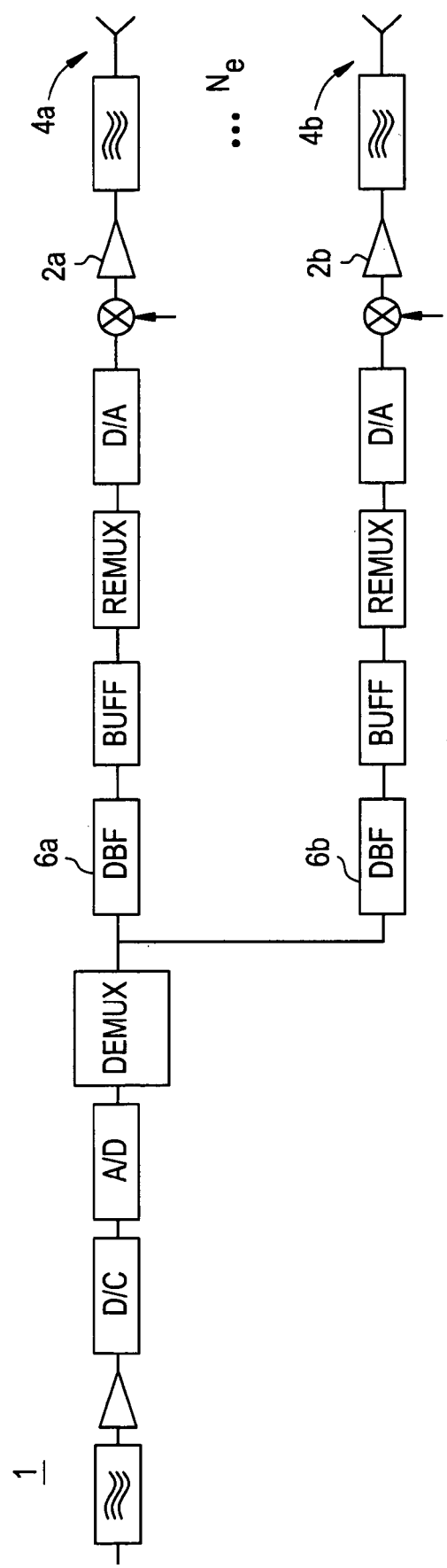

SMALLER APERTURE ANTENNA FOR MULTIPLE SPOT BEAM SATELLITES

This application claims the benefit of U.S. Provisional Application No. 60/218,214, filed Jul. 14, 2000, under 35 U.S.C. § 119(e).

BACKGROUND OF THE INVENTION

1. Field of the Invention

This invention relates in general to satellite communications systems. More particularly, this invention relates to the generation of basic spot beams for multiple-beam satellite systems, and a method for dividing the basic spot beam that has high e.g. 3–4 dB gain drop into a number of smaller sub-beams with a low e.g. 1 dB gain drop, using the existing frequencies of the basic spot beams.

2. Background of the Related Art

A phased array antenna generally includes a collection of radiating elements closely arranged in a predetermined pattern and energized to produce beams in specific directions. When elements are combined in an array, constructive radiation interference results in a main beam of concentrated radiation, while destructive radiation interference outside the main beam reduces stray radiation.

In satellite communications systems as illustrated in FIG. 5, signals are typically beamed between satellites 100 and fixed coverage region(s) on the Earth 102 using these beams of concentrated radiation. Bandwidth is often a limited resource, and has to be used efficiently. In order to cover such large regions and reuse the same frequency, the use of a multiple beam phased array antenna 101 has been discovered to be an effective solution. Beam coverage from the phased array antenna 101 is accomplished by producing a number of spot beams 104 directed towards specific areas 103 of the coverage region. These spot beams 104 are generated by energizing radiating elements of the phased array antenna with selected amplitudes and phases, and can be realized by the use of a Digital Beam Former (DBF).

The DBF operates in conjunction with the phased array antenna to realize the multibeam coverage by applying appropriate phase shifts to each of the radiating elements in the array.

To completely cover a satellite service area with spot beams, it is customary to use a network of contiguous beams, where each beam is defined at a contour level of 3- to 4-dB from the beam peaks. The phased array antenna is therefore sized to accommodate the peak gains required in order to satisfy these edge gain requirements, which results in a large aperture for the phased array antenna due to the fact that aperture size is directly related to the peak gain requirements.

This large aperture that is needed to achieve the high peak gain at the scanned position will have to be populated with a large number of radiating elements. The excessive number of antenna elements, combined with the large number of beams, make the beam former very complex, with high power and mass requirements. This is due to the fact that the complexity, mass, and power requirements of the digital beam former are increased depending principally upon the number of elements, and are much less dependent on the number of beams.

SUMMARY OF THE INVENTION

In accordance with the present invention a new method to generate a large number of spot beams for multiple satellite systems using smaller apertures is shown.

The basic spot beam is redefined to be made up of a number of sub-beams sharing the bandwidth allocated to the basic beam. These sub-beams each have an edge gain of 1-dB lower than their peak, therefore reducing the peak gain requirement for the antenna by 2- to 3-dB.

The size of the antenna or phased array aperture, and the number of elements in the array, are dependent on this peak gain. Thus, by using sub-beams that only require a peak gain 1 dB higher than their respective edge gains, the corresponding size of the phased array antenna aperture, and the number of elements in it, can be reduced.

The use of sub-beams will necessarily increase the number of beams to be generated by the beam former. However, the DBF complexity, mass, and power requirements will be reduced because of their dependency on the number of elements in the array, which are reduced by the use of sub-beams. These characteristics are only marginally dependent on the number of beams formed.

The present invention is therefore an improvement on the prior art because the size of the antenna or phased array aperture can be decreased by use of the multiple sub-beams.

BRIEF DESCRIPTION OF THE DRAWINGS

FIG. 1 illustrates a system capable of transmitting sub-beams.

DETAILED DESCRIPTION OF THE INVENTION

The system for creating multiple-beams is illustrated in FIG. 1. The transmitter 1 is made up of a common path having a down converter (D/C), analog to digital converter (A/D) and demultiplexer (DEMUX), leading to plural parallel paths having radiating elements 4a, 4b, power amplifiers 2a, 2b, and a DBF 6a, 6b. The combination of the radiation created by the antenna elements 4a, 4b and the steering of this radiation by the DBF 6a, 6b creates multiple spot beams according to the present invention.

Figure 2A:
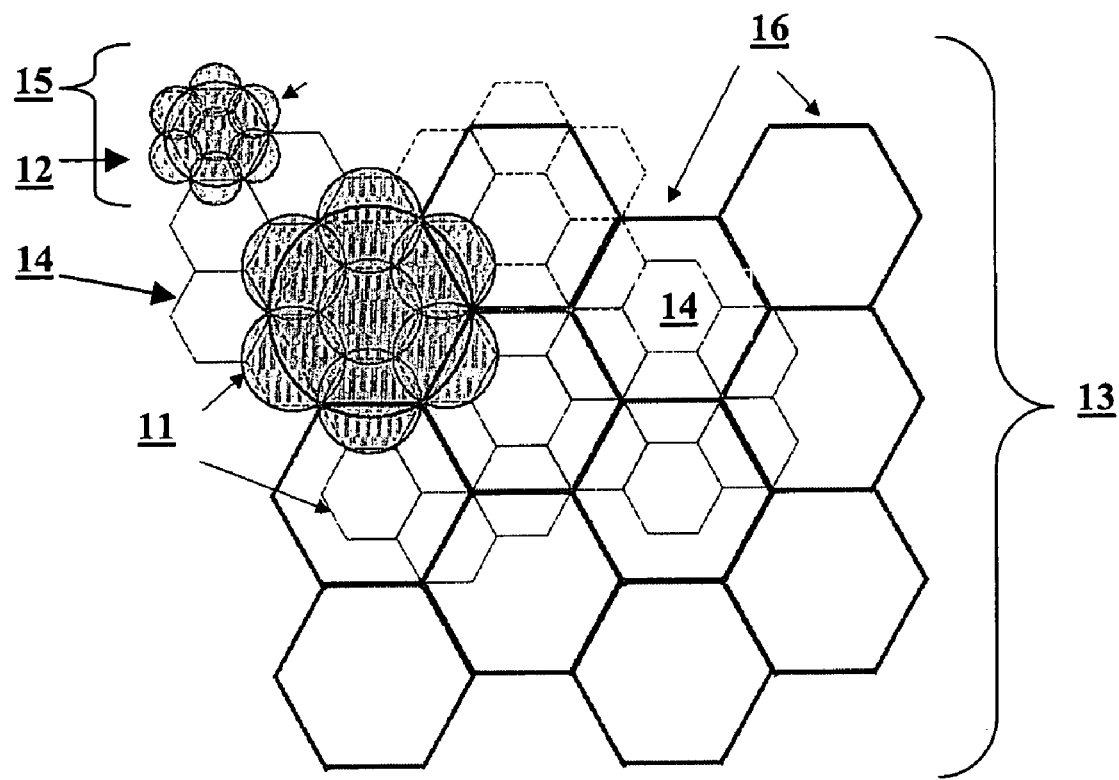
FIG. 2A illustrates a comparison of sub-beam and basic beam patterns for several constructions.

A sub-beam implementation according to the present invention, as illustrated in FIG. 2A, has each basic spot beam 11, divided into a number of smaller sub-beams 12, in clusters 15. Each sub-beam 12 is defined by contour levels substantially less than 3 dB. This cluster of sub-beams, which generates a coverage 14 equivalent to a single spot beam, is generated based on requirements for peak gain and coverage discussed below.

Each spot beam is defined by a contour level of approximately 3 dB. FIG. 2A illustrates an area of continuous coverage 13 that is conventionally covered by a plurality of basic beam clusters, defined by polygonal region 16 for planning purposes, each polygonal region 16 being covered by a further cluster of polygonal sub regions 14, one or more of which are wholly within the region 16 and the remainder being partially within the region 16. Conventionally, a spot beam 11 is formed to provide a beam, typically with a circular footprint encompassing the entire sub region 14.

The number N of beams 12 in the sub-beam cluster 15 can be chosen such that a contiguous coverage of area 14 is achieved and the application of the principle to have a plurality of sub-beam clusters 15 formed for each of the adjacent areas 14 so that a contiguous coverage of area 13 is achieved. The number N, of sub-beams 12 within the clusters 15 is determined from integer numbers that satisfy $N=i^2+j^2+ij$, where i and j are non-negative integers. This results in values such as 1, 3, 4, and 7, but is not limited to these, and the number of beams 12 in the sub-beam cluster 15 need not be the same. Thus, sub-beam clusters 15 with different numbers of sub-beams can be utilized. FIGS. 2A–2D illustrate sub-beam clusters using 1, 3, 4, and 7 beams, respectively. In FIGS. 3A–3D, each basic beam 11 is shown with a corresponding number of sub-beams 12.

The relationship between the relative edge gain of the basic spot beam 11, and the relative edge gain of the sub-beams 12 can be determined as a function of the number of sub-beams that make up a sub-beam cluster. Assuming that sub-beams use edge contours of $x_s$ dB relative to peak to generate the basic beam, which is defined at its $x_b$ dB contour level, the gain relationship can be written as:

$$G_b - x_b = G_s - x_s \quad (1)$$

where $G_b$ and $G_s$ refer to the peak gain values of the basic and sub-beam arrays, respectively and $x_b$ and $x_s$ denote the contour levels for which each beam is defined. The peak gain of an antenna can be related to its half power beam width (hpbw), $\theta_3$ by an empirical relationship, $$G = 10 \log\left(\frac{A}{\theta_3^2}\right) \quad (2)$$

where A is a constant which includes antenna efficiency. An empirical relationship can be obtained to relate the beamwidth of a phased array at an arbitrary contour level to its hpbw by using the definition of the array factor as:

$$\theta_x = \theta_3 * 0.59 * x^{0.4806} \quad (3)$$

where the units of the beamwidth are in degrees. Using equations (2) and (3) in (1), the contour levels of the basic and sub-beams can be related to their beamwidths as follows:

$$9.612 \log\left(\frac{x_s}{x_b}\right) + x_b - x_s = 20 \log\left(\frac{\theta_s}{\theta_b}\right) \quad (4)$$

where $\theta_s$ and $\theta_b$ denote the sizes of the sub-beams and basic beams, respectively. The beamwidth ratio, $\theta_s/\theta_b$ in equation (4) depends on the cluster geometry and is equal to 1, 1, 0.707 and 0.5 for sub-beam cluster sizes of 1, 3, 4 and 7, illustrated in FIGS. 3A–3D, respectively.

Figure 3:
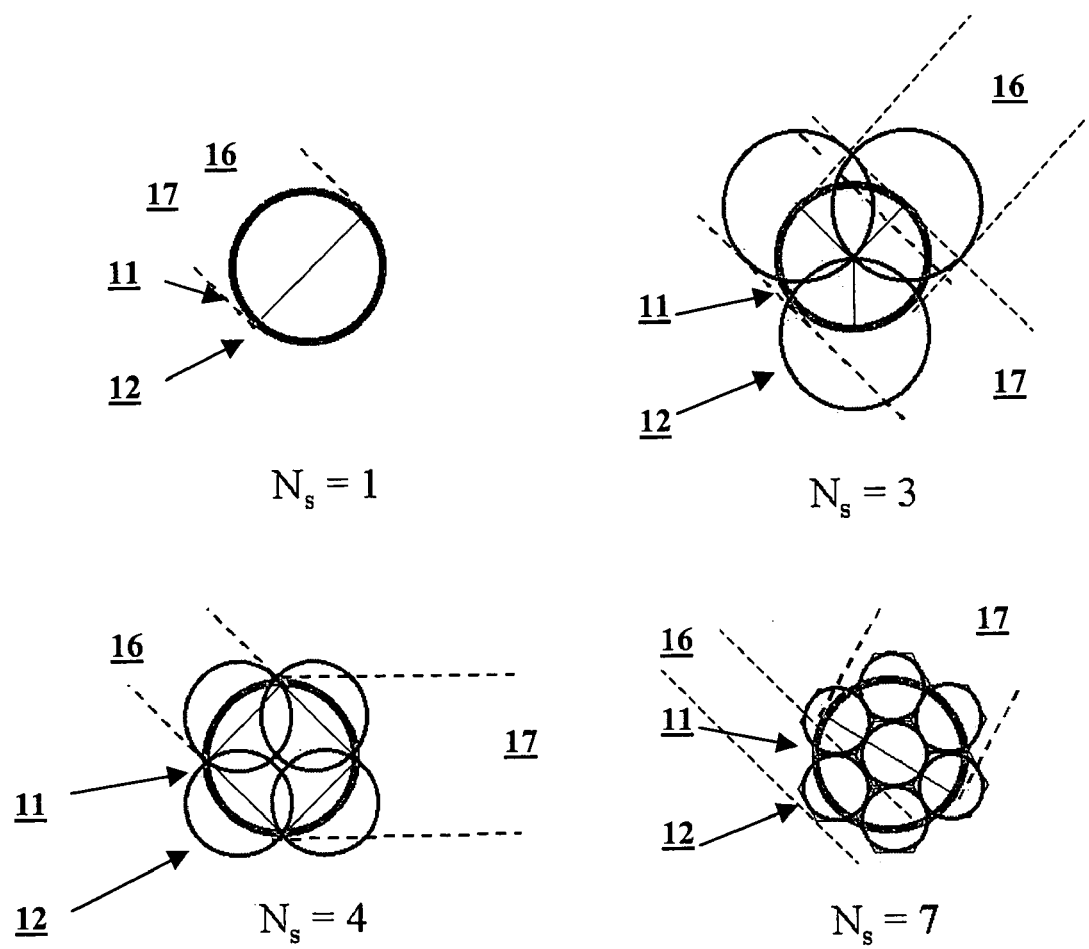
FIG. 3 describes the sub-beam relationship to the basic beam.

The cases when the cluster size equals to 1 and 3, FIGS. 3A and 3B respectively, are trivial and do not reduce the aperture size, as the beamwidths of the sub-beam beamwidths 16 and the basic beam 17 are equal. The cluster sizes of 4 and 7 reduce the sub-beam beamwidth 16 to 70% and 50% of the basic beamwidth 17, respectively. The corresponding reduction in the antenna gain, $G_b-G_s$, for $N_s=4$ and $N_s=7$ are determined from equation (4) for a basic beam edge level of 4 dB as 3.05 dB and 3.6 dB, respectively. This corresponds to more than 50% reduction in the antenna size.

For example, in a Low Earth Orbit (LEO) satellite system, one can use the following parameters to compare the prior art to the new invention: Altitude=9600 km, 4 dB edge gain=36 dBi, minimum elevation angle=20°, frequency=1.9 GHz. The view angle of the satellite and the maximum scan angle requirements are calculated from the altitude and minimum elevation angle as 44° and 22°, respectively.

The total number of elements in a phased array antenna is dependent on the element spacing. The element spacing needs to be chosen such that there are no visible grating lobes within the view of the antenna. This is determined from the maximum scan angle using $d/\lambda \leq \frac{1}{2} \sin(\theta_{max})$, where $\theta_{max}$ is the maximum scan angle. This results in a maximum element spacing of 1.34λ. To effectively cover the aperture, the radiating element size is chosen to be equal to the element spacing. A circular horn with a radius 0.67λ is used in generating a rectangular grid of elements to construct the phased array aperture.

A 6.0 m aperture using 784 (=28×28) elements achieves the peak gain value of 40.0 dBi with a beamwidth of 1.9° at its 4.0 dB contour level.

In contrast, for a sub-beam cluster size of 4, equation (2) suggests that the beamwidth, which is approximately 70% of the size of the basic beam can be achieved at its 0.95 dB contour level with 3.05 dB lower peak gain than the basic beam. This results in required gain value of 36.95 dBi as opposed to the 40.0 dBi of the basic beam. Similarly for $N_s=7$, the beamwidth, which is 50% of the basic beam, can be achieved at the 0.4 dB contour level with 3.6 dB lower peak gain than the basic beam. This results in a required peak gain of 36.4 dBi as opposed to 40.0 dBi of the basic beam.

An aperture size of 3.8 m achieves the gain and beamwidth requirements. This translates into 324 (=18×18) elements spaced at 1.34λ apart. Compared to the 784 element solution of the conventional design, a 60% reduction in element size is achieved with the sub-beam design.

Figure 4:
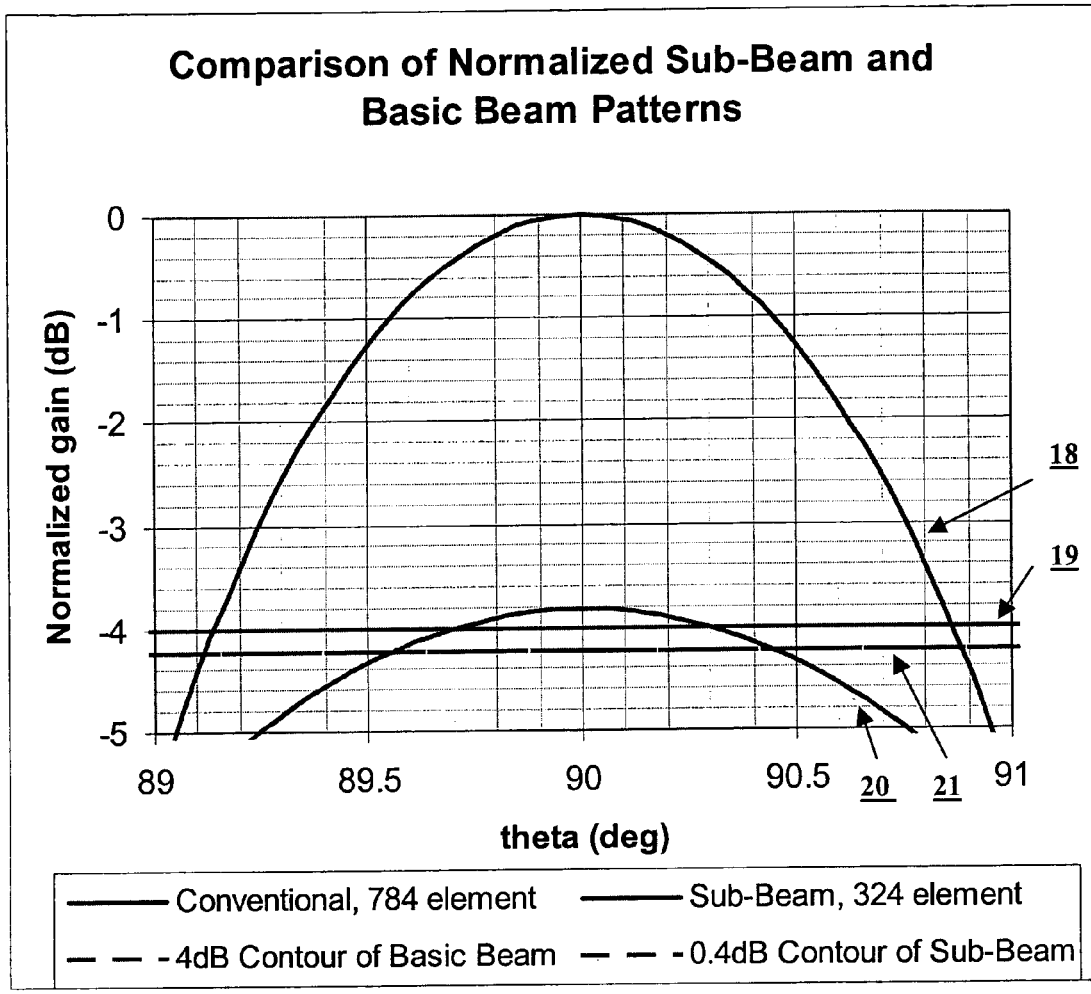
FIG. 4 illustrates the differences in required gain between a basic beam and a group of sub beams.
Figure 5:
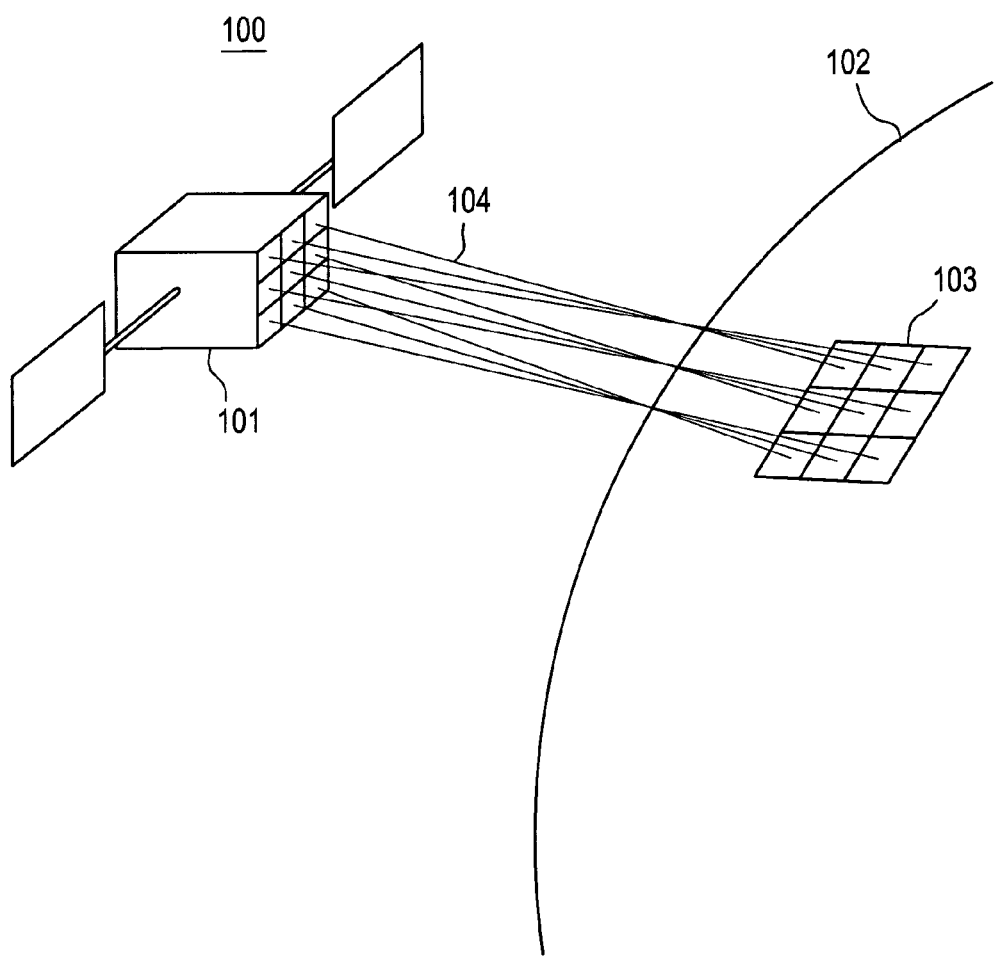
FIG. 5 is an example of a multiple beam satellite system of the prior art.

Looking at FIG. 4, a comparison of the gain and beamwidth values for the basic beam 18 and sub-beam 20 pattern is shown. The −4 dB contour level for the basic beam 19 and the −0.4 dB contour level for the sub-beam 21 are also shown in the same plot. The gain of the sub-beam is about 3.8 dB lower than the basic beam and its beamwidth at −0.4 dB contour is about half of the basic beam, which is the desired case for a cluster size of 7.

Figure 2B:
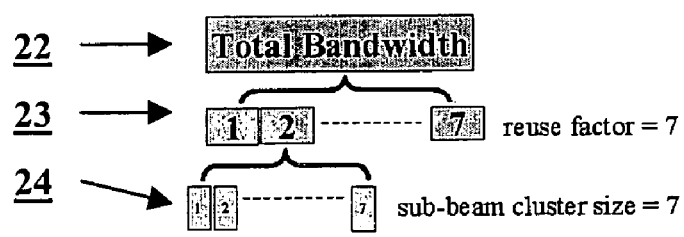
FIG. 2B illustrates the frequency relationship between the basic beam and sub-beam.

Additionally, looking at FIG. 2B, by dividing the allocated bandwidth for each basic beam 23 among its sub-beam components 24, the frequency reuse can be maintained without introducing any complexity to the system.

In a multibeam system, the application of the present invention will increase the number of beams that the array has to generate. However, the generation of an increased number of beams is accomplished by the DBF, and is a factor that will not present any difficulty or added complexity due to the fact that the complexity of a DBF depends on the element size of the array rather than the number of beams generated. Further, in such a multibeam system, the interference levels will increase due to the fact that the sub-beams extend outside the edges of a basic beam. However, higher $N_s$ values reduce this effect due to two factors: First, larger number of sub-beams in a cluster mean smaller beam sizes achieved at lower peak gain levels and at lower contour levels. This assures a more uniform power distribution equal to the edge gain requirement within each beam, and reduces the overall interference. Second, as the number of beams in a sub-beam cluster increase, the basic beam is defined more closely, reducing the overlap at the outer edges of the beam.

Thus, the sub-beam design concept reduces the aperture size and the number of elements in a phased array by reducing the peak gain requirements to generate coverage within each basic beam. The use of smaller beams at lower gain values also helps reduce the overall interference in the system if the number of elements in the sub-beam cluster is high enough such that the basic beam is represented without too much overlap to the neighbor beams. A sub-beam cluster size of 7 has been investigated in applying the technique to a LEO multiple beam satellite system. The results have shown a 60% reduction in the number of elements and the size of the aperture for simulations of the center beam in the coverage area. It is expected that the same performance can be maintained for other beams, which require scanning, because the same scan loss is expected for both the basic beam and sub-beam array antennas.

While the principles of the invention have now been made clear in the illustrated embodiments, there will be immediately obvious to one skilled in the art, many modifications of structure, arrangements, proportions, the elements, materials, and components used in the practice of this invention and otherwise, which are particularly adapted for specific environments and operation requirements without departing form these principles. The appended claims are therefore intended to cover and embrace any such modifications within the limits only of the true spirit and scope of the invention.

What is claimed is:

1. A method of communicating via satellite in a system comprising a satellite having a first type antenna capable of transmission of communication signals to a region on the earth's surface and a plurality of earth stations disposed in said region, each earth station having a second type antenna capable of reception of said signals, said method comprising;
    transmitting from said first type antenna multiple sub-beams within bandwidth allocated to a basic spot beam to said plurality of antennas in said region,
    wherein the number of said sub-beams N are defined by the mathematical equation $N=i^2+j^2+ij$, where i and j are non-negative integers.

2. A method of communicating via satellite in a system comprising a satellite having a first type antenna capable of transmission of communication signals to a region on the earth's surface and a plurality of earth stations disposed in said region, each earth station having a second type antenna capable of reception of said signals, said method comprising;
    transmitting from said first type antenna multiple sub-beams within bandwidth allocated to a basic spot beam to said plurality of antennas in said region,
    wherein said sub-beams require less peak gain than said basic spot beam, and
    where each sub-beam is defined by a contour level, said contour level determined by a required edge gain.

3. A method as claimed in 2, wherein the gain relationship between said basic spot beams and said sub-beams can be defined by the equation $G_b-x_b=G_s-x_s$ where $G_b$ and $G_s$ refer to said peak gain values of said basic spot beams and said sub-beams respectively, and $x_b$ and $x_s$ denote the contour levels for which each beam is defined.

4. A method as claimed in 3, wherein the peak gain of said antenna can be related to its half power beam width (hpbw), $\theta_3$ by an the equation $$G = 10 \log\left(\frac{A}{\theta_3^2}\right),$$

where A is a constant partly defined by antenna efficiency.

5. A method as claimed in 4, wherein the beamwidth of a phased array at an arbitrary contour level to its hpbw is determined by the equation $\theta_x=\theta_3*0.59*x^{0.4806}$, where the units of the beamwidth are in degrees.

6. A method as claimed in 3, wherein the contour levels of said basic and said sub-beams can be related to their beamwidths by the equation $$9.612 \log\left(\frac{x_s}{x_b}\right) + x_b - x_s = 20 \log\left(\frac{\theta_s}{\theta_b}\right),$$

where $\theta_b$ is basic beamwidth and $\theta_s$ is sub-beam beamwidth.

* * * * *